United States Patent [19]
Kobayashi

[11] Patent Number: 5,609,481
[45] Date of Patent: Mar. 11, 1997

[54] DIRECT-FIRED STRATIFIED ATMOSPHERE FURNACE SYSTEM

[75] Inventor: Hisashi Kobayashi, Putnam Valley, N.Y.

[73] Assignee: Praxair Technology, Inc., Danbury, Conn.

[21] Appl. No.: 489,883

[22] Filed: Jun. 13, 1995

[51] Int. Cl.⁶ .................................................. F27B 3/22
[52] U.S. Cl. ............................................. 432/22; 432/23
[58] Field of Search ............................ 432/19, 22, 23, 432/103, 105, 111, 13

[56] References Cited

U.S. PATENT DOCUMENTS

| | | | |
|---|---|---|---|
| 2,308,902 | 1/1943 | Weller | 432/22 |
| 3,074,707 | 1/1963 | Humphries et al. | 432/19 |
| 3,279,774 | 10/1966 | Biro | 432/22 |
| 3,488,700 | 1/1970 | Iken et al. | 432/22 |
| 4,927,357 | 5/1990 | Yap | 432/22 |
| 4,957,050 | 9/1990 | Ho | 110/346 |
| 5,076,779 | 12/1991 | Kobayashi | 431/5 |
| 5,176,086 | 1/1993 | Clark et al. | 110/346 |

FOREIGN PATENT DOCUMENTS 60-238415  11/1985  Japan ........................ 432/22

Primary Examiner—Noah P. Kamen
Attorney, Agent, or Firm—Stanley Ktorides

[57] ABSTRACT

A direct-fired furnace wherein a charge-proximal stratum is established between the charge and combustion gases emanating from one or more or burners oriented above the charge, wherein the charge-proximal stratum has a different oxidative effect upon the charge than does the combustion gases.

13 Claims, 3 Drawing Sheets

5,609,481

DIRECT-FIRED STRATIFIED ATMOSPHERE FURNACE SYSTEM

TECHNICAL FIELD

This invention relates generally to direct-fired furnaces and their operation.

BACKGROUND ART

Furnaces are used in many different industrial applications to heat and/or melt a charge such as steel. Furnaces may be generally categorized as being of two types, the indirectly-fired type and the directly-fired type. Indirectly-fired furnaces employ radiant tubes, through which hot fluid passes, or electrical resistance coils, to provide heat into the furnace which is then used to heat the charge. Directly-fired furnaces employ one or more burners to combust fuel and oxidant to provide heat into the furnace for use to heat the charge.

Directly-fired furnaces are preferred over indirectly-fired furnaces because an indirectly-fired furnace is generally more expensive to construct and generally also has higher maintenance costs. Moreover, heat transfer efficiency is generally lower in indirectly-fired furnaces than in directly-fired furnaces. However, if product quality is a significant issue, it may be necessary to employ an indirectly-fired furnace despite its disadvantages. This is because in a directly-fired furnace, combustion gases are injected into the furnace atmosphere from the burner or burners which provide the heat to operate the furnace. Combustion gases include water vapor, carbon dioxide and oxygen and may also include nitrogen, uncombusted or incompletely combusted fuel, and other gases. One or more of the combustion gases may have a deleterious effect upon the furnace charge when such gas or gases contacts the charge.

It is preferable for fuel efficiency as well as for environmental reasons to employ pure oxygen or an oxygen-enriched fluid rather than air as the oxidant with a burner in a directly-fired furnace. However, oxygen or oxygen-enriched fluid generally requires a higher combustion mixture injection velocity from the burner in order to avoid hot spots and uneven combustion. Such higher velocity results in greater mixing of the combustion mixture but also causes more of the combustion gases to come in contact with the charge.

Accordingly, it is an object of this invention to provide a direct-fired furnace system which will enable effective heating and/or melting of the furnace charge while reducing the deleterious effects resulting from contact of the furnace charge with combustion gas or gases.

SUMMARY OF THE INVENTION

The above and other objects which will become apparent to one skilled in the art upon a reading of this disclosure are attained by the present invention which is:

A method for heating or melting a charge of material in a direct-fired furnace, comprising, (A) introducing said charge into said furnace to expose said charge to radiant heat from a direct-fired burner placed above said charge;

(B) providing fuel and oxidant into the furnace from said direct-fired burner at a velocity not exceeding 50 feet per second, and combusting the fuel and oxidant within the furnace to generate said heat and to produce combustion gases; and (C) introducing a charge-proximal gas into the furnace between said direct-fired burner and said charge at a velocity not exceeding 50 feet per second to create a charge-proximal atmospheric stratum that contains a substantially reduced amount of said combustion gases, thereby exposing said charge to a furnace atmosphere of oxidative properties that are different from those that exist in the absence of said charge-proximal gas.

DETAILED DESCRIPTION

The invention relates to an improved process for heating and/or melting a charge of material in a direct-fired furnace. The charge is introduced into the furnace and exposed to radiant heat from a direct-fired burner placed above the charge. A charge-proximal gas is introduced between the direct-fired burner and the charge to create an atmospheric stratum near the charge that substantially shields the charge from the normal furnace atmosphere which includes combustion gases resulting from the direct-fired burner. This charge-proximal atmosphere stratum has a composition that either increases or decreases oxidation of the charge compared to the oxidation that would have taken place in the absence of this stratum.

The present invention relates to stratification of the atmosphere within a direct-fired furnace in order to achieve beneficial results in the heating of particular charge materials. By "stratification," it is meant that an atmospheric stratum is created between the direct-fired burner in the furnace and the charge material, that serves to substantially shield the charge from the furnace combustion products. The stratum has a composition that increases or decreases oxidation of the charge that would otherwise occur. This stratum is referred to as "charge-proximal," and is achieved by introduction of a "charge-proximal", or mixture of gases, into the furnace. A stratum formed above the charge-proximal stratum that contains a higher concentration of combustion gases is termed a "combustion stratum".

The charge-proximal stratum and combustion stratum will mix with each other to some extent; thus the two need not be, and usually will not be, entirely distinct. Nevertheless, as a result of introducing the charge-proximal gas and creating the charge-proximal stratum, oxidation of the charge material can be controlled in a manner substantially independent of the composition and oxidative properties of the combustion stratum. A furnace containing such a stratified atmosphere substantially retains the advantages of a direct-fired furnace (e.g., high heat transfer rate and low cost) but allows control of the atmosphere to which the charge is exposed.

Figure 2:
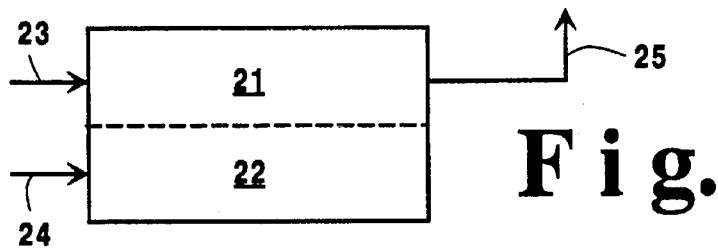
FIG. 2 is a schematic representation of a stratified atmosphere furnace according to the invention.

FIG. 2 depicts a "stratified" furnace atmosphere that contains two strata: the combustion stratum 21 and the charge-proximal stratum 22. The combustion stratum is established by the introduction of fuel and oxidant 23 into the furnace and contains a higher concentration of combustion products from the burner, i.e., the $CO_2+H_2O+O_2$ emitted from the burner, than the charge-proximal stratum which is established by the introduction of charge-proximal gas 24 into the furnace. In some cases the charge-proximal stratum will be inert with respect to the charge and will simply shield the charge from those combustion products. In other cases, the charge-proximal stratum will contain gases that reduce oxides in the charge. In other cases the charge-proximal stratum may be made up of oxidative gases that amplify oxidative effects of the combustion products, i.e., the stratum can be even more oxidizing than the combustion products. It is thus possible for the charge-proximal gas to contain a gas that is the same type as one or more of those emitted by the burner as a combustion product, or as unused oxygen, e.g., $O_2$ but in a higher concentration so as to amplify the oxidation that would otherwise take place. In yet other cases the charge-proximal gas may be made up of natural gas or other hydrocarbon gases which may be used in heating or heat treating metals such as steel. Furnace gases are removed from the furnace through flue 25.

Where it is desired to reduce oxidation of the charge, the composition of the charge-proximal gas is chosen to be substantially inert (or reductive) with respect to the charge. Nitrogen can be advantageous in this embodiment because of its low cost and low environmental impact. Argon, however, may better protect the charge from oxidation because it is heavier than air and thus less likely to mix with the burner combustion products.

Use of a charge-proximal gas that is oxidizing in the process of the invention is advantageous in heating charges that benefit from such oxidation. An example is the firing of glass, wherein the charge-proximal stratum can contain gases with higher oxidative capacity (e.g., oxygen or oxygen-enriched air) than the combustion stratum.

The discussion that follows may, in places, particularly describe use of inert or reducing charge-proximal stratum wherein steel is the charge, but it is understood that modifications will be apparent to one skilled in the art with respect to using other charges, such as aluminum or glass, or other charge-proximal gases.

In general, it is advantageous to minimize mixing of the uncontrolled atmosphere of the combustion stratum with the controlled atmosphere of the charge-proximal stratum. This means largely avoiding mixing of the combustion products from the directly fired burner into the charge-proximal gas. This is accomplished by providing the fuel and oxidant into the furnace at a mass average velocity not exceeding 50 feet per second (fps) and preferably at a mass average velocity not exceeding 10 fps. The fuel and oxidant may be provided separately into the furnace or together in a premixed condition. The fuel is preferably natural gas although other fuels such as oil may be used. The preferred oxidant is a fluid having an oxygen concentration of at least 30 mole percent, preferably exceeding 80 mole percent, although air may also be used as the oxidant. The oxidant may be commercially available pure oxygen. The charge-proximal gas is provided into the furnace at a velocity not exceeding 50 fps, preferably not exceeding 10 fps. The extremely low velocities of both the burner gases and the charge-proximal gas as they are provided into the furnace, along with the different vertical position of their respective provision points relative to the charge, serve to stratify the furnace atmosphere. Effective stratification results when the concentration of an active species, i.e. an oxidizing or reducing species, in the charge-proximal gas next to the surface of the charge differs by a factor of 2 or more from its concentration in the combustion stratum.

In the embodiment of the invention in which oxidizing gases are reduced near the surface of the charge, they are preferably reduced to less than 50 percent of the level that prevails without the inert gas. More preferably, the oxidizing gases are reduced to a level less than 10 percent of the level that exists without inert gas, and most preferable below 5 percent. This can be accomplished by selection of the composition of the charge-proximal gas, by adjustment of its flow rate and velocity, by strategic positioning and orientation of the charge-proximal gas introduction point(s) with respect to the charge and the burner.

The throughput (flow rate) of the charge-proximal gas can be adjusted to attain the desired reduction in oxidizing gases. A higher flow rate of charge-proximal gas will generally result in a greater reduction. The lowest flow rate that achieves the desired reduction in oxidizing gases is preferred.

Within limits, as will be appreciated by those skilled in the art, the flow rate and velocity of gases from the burner (as well as their velocity) can also be selected to reduce the level of oxidizing species near the charge. For example, a low-velocity type burner is preferred because its low-velocity reduces mixing of combustion products with the charge-proximal stratum.

The position of the flue or exhaust within the furnace is also important for minimizing mixing by making it possible to discharge gases from the combustion stratum and from the charge-proximal stratum without causing substantial mixing of the two strata. It is most preferred to locate the flue in or near the furnace ceiling, for example directly above the burner. Locating the flue below the burner is generally not preferred. Determining the optimum flue position for a particular furnace may require some experimentation. It also may be desirable to employ more than one flue, such as adding an additional flue at or about the level of introduction of the charge-proximal gas, to separately exhaust some of the charge-proximal gas.

The charge-proximal gas is introduced into the furnace at any vertical level below the burner. In general it is preferable to increase the vertical distance between the gas and the burner to minimize mixing of the charge-proximal and combustion strata. Preferably the charge-proximal gas is introduced into the furnace at a point at least 50 percent, most preferably at least 75 percent of the vertical distance from the burner to the charge surface. The charge-proximal gas should fill the space between the burner combustion gases and the charge. To accomplish this, various parameters of the particular furnace may need to be adjusted, e.g., flue position, gas flows, position and orientation of charge-proximal gas ports. The number and diameter of the charge-proximal gas ports may need to be adjusted as well. It is desirable to keep the flow of the charge-proximal gas laminar.

A variety of configurations of burner, charge-proximal gas inlet, and flue will be apparent to one skilled in the art in light of the present invention. Several non-limiting examples are shown in FIGS. 3A, 3B, 3C and 3D. In the configuration shown in the embodiment illustrated in FIG. 3A, the burner 31 is placed directly in the roof of the furnace, and charge-proximal gas inlets 32 positioned at opposing side walls of the furnace. Low velocity premixed radiant burners using porous elements are particularly preferred for this arrangement. All of the gases are exhausted through a flue 33 at the top of the furnace. In the embodiment illustrated in FIG. 3B, the burner 34 is positioned at one side of the furnace near the top, and the charge-proximal gas 35 is injected from the same side between the burner and the charge. All gases are exhausted through two flues 36 on the side of the furnace opposite the charge-proximal gas ports. In the embodiment illustrated in FIG. 3C, burners 37 are positioned just below the top, charge-proximal gas 38 is injected from the side, and flues 39 are positioned at the top of the furnace. In the embodiment illustrated in FIG. 3D, the burner flame 40 is directed upwards from both sides of the furnace; the charge-proximal gas 41 is directed inward from opposite sides at a level between the burners and the charge. Gases are exhausted through a flue 42 in the top of the furnace. Variations on these embodiments will be apparent. For example, the burner flame may be injected from opposing sides of the furnace, and the charge-proximal gas injected from a third side, i.e., at a 90 degree angle to the burner flames.

It is also possible, instead or in addition, to inject the charge-proximal gas through the charge, using tuyeres, once the charge has become molten. For example, an inert gas such as argon might be bubbled through molten steel, in order to reduce exposure to oxidizing gases.

To help maintain stratification in the furnace, it is preferred that the charge-proximal gas have a higher density than the gas, or gases, employed in or generated by the burner. Proper buoyancy is thereby achieved that can suppress mixing of oxidizing gas from the burner with the gas stream, particularly where there is a high volumetric flow through the burner.

In general, the size and shape of the furnace is important in determining the flows that are used. A tall furnace is generally easier to stratify. Thus, while a flow ratio of charge-proximal gas:fuel of 1.0 might be appropriate in a tall furnace, a higher ratio of e.g., 3.0 might be appropriate in a shorter furnace.

The furnace can be operated at normal temperatures that are required for heating of steel or other charges with proper refractory material selection. It is believed that the combustion stratum can be operated up to a temperature of roughly 3500° F. while realizing advantages of the invention.

Stratification of the atmosphere within a furnace limits convective heating of the charge. It is therefore desirable that the furnace wall be kept at a high temperature (i.e., to provide radiant heating that makes up for the loss of convective heating). Since heat transfer in most industrial furnaces is dominated by radiation, and radiative heat transfer increases sharply with furnace temperature, a 50° to 200° F. increase in temperature is sufficient in most cases. Walls made of conventional refractory materials, e.g., alumina-silica bricks, will normally provide such re-radiation. If desired, however, the furnace can be constructed of special high temperature ceramic materials such as alumina-zirconia-silica bricks to operate at higher temperatures.

As noted above, the distance between the direct-fired burner and the injection means for the charge-proximal gas can also be adjusted to increase stratification. In general, the greater the distance between them, the more stratification will be obtained. The orientation of the inlet port for the charge-proximal gas can also be used to advantage.

Combustion using pure oxygen or oxygen-enriched fluid, having an oxygen concentration of at least 30 mole percent, to burn fuel is preferable to combustion using air. Proper stratification is easier to achieve by using pure oxygen or oxygen-enriched fluid as the oxidant for the combustion because the volume of combustion gas is reduced. Oxygen or oxygen-enrichment also reduces sensible heat loss associated with nitrogen contained in air, and thus provides more heat available per unit volume of burner gas, resulting in fuel savings.

The furnace employed is preferably a reverberatory type furnace, well known in the art. Other types of furnaces may be employed, however, including a rotary kiln and a rotary hearth furnace Existing furnaces may be retrofitted with appropriate means for injecting the charge-proximal gas, with an appropriate burner or burners, and any other adjustments, such as those described above, that may be required to achieve stratification. Alternately, a new furnace can be constructed taking these considerations into account.

Figure 1:
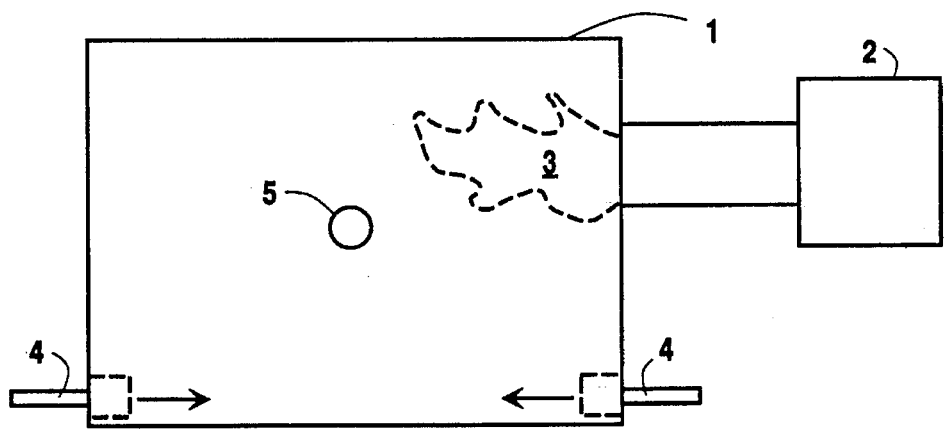
FIG. 1 is a simplified cross-sectional view of one furnace arrangement which may be used in the practice of this invention.
Figure 5:
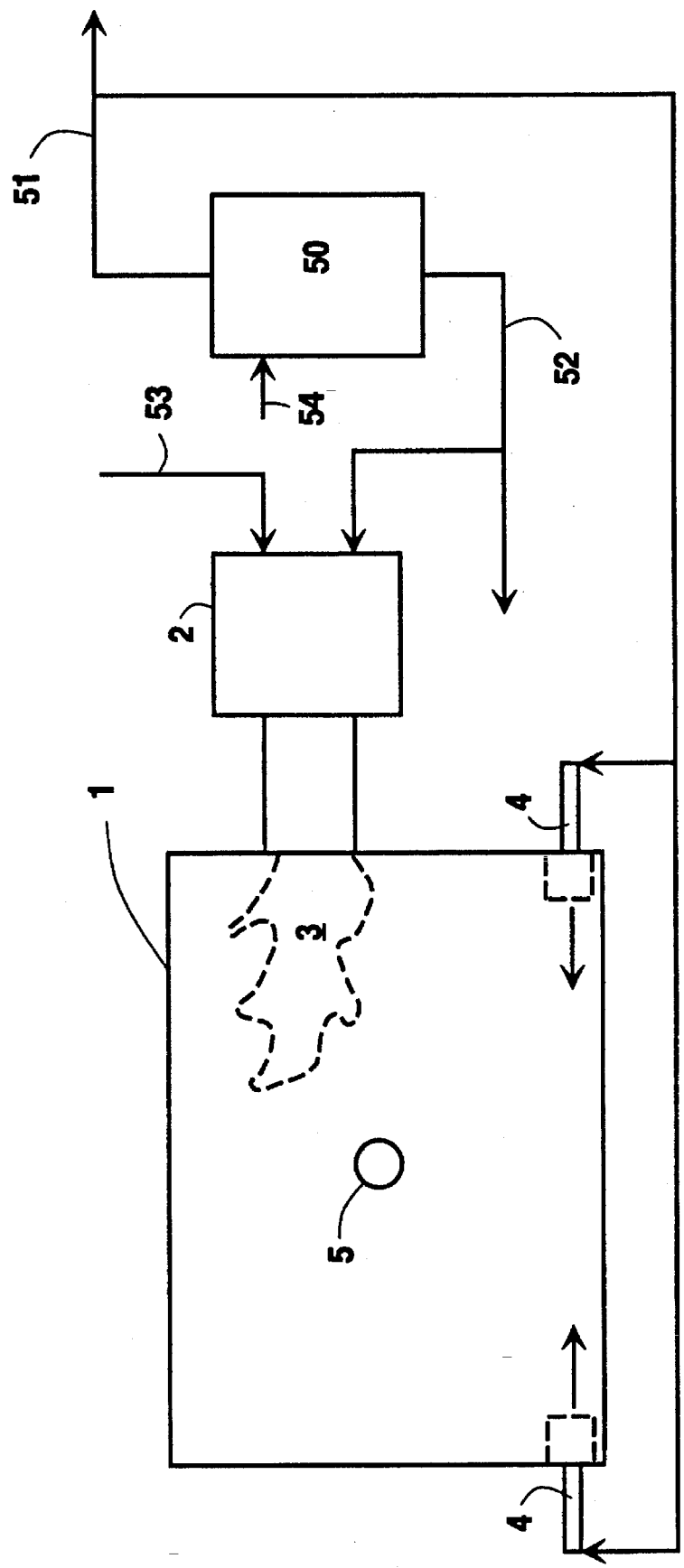
FIG. 5 is a simplified representation of the integration of the practice of the method of this invention with an air separation plant.

The method of this invention may be effectively integrated with an air separation system wherein a feed stream comprising nitrogen and oxygen is separated into fluids richer respectively in nitrogen and oxygen than is the feed stream. For example, a nitrogen-rich stream from a pressure swing adsorption separation plant or a membrane separation plant may be used as the charge-proximal gas, while the oxygen-richer stream from the plant may be used as the oxidant for the burner. Such a system is illustrated in a simplified manner in FIG. 5 wherein the system illustrated in FIG. 1 is shown integrated with air separation plant 50 having a feed stream 54 which is typically ambient air. A portion of nitrogen-rich stream 51 passes to diffusers 4 while a portion of oxygen-enriched stream 52 passes to burner 2 for use with fuel 53. In another integration scheme, flue gas from the furnace may be fed into a gas separation system to produce nitrogen.

The following example is presented for illustrative purposes and is not intended to be limiting.

Figure 4:
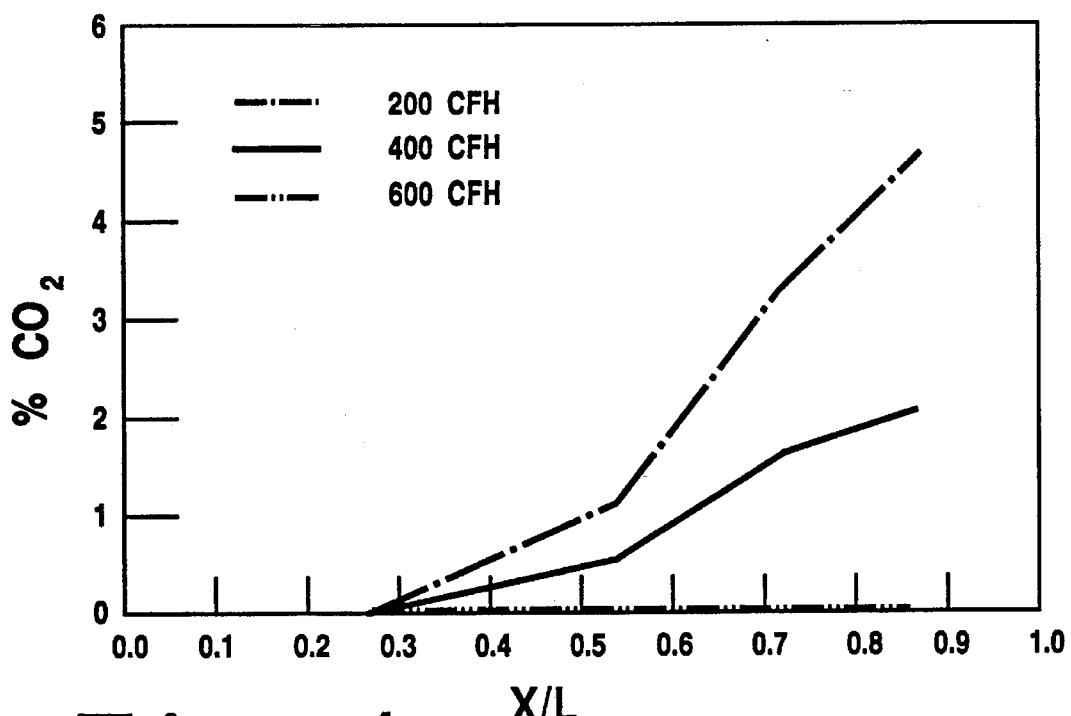
FIG. 4 is a graphical representation of results from tests of the invention.
Figure 3A:
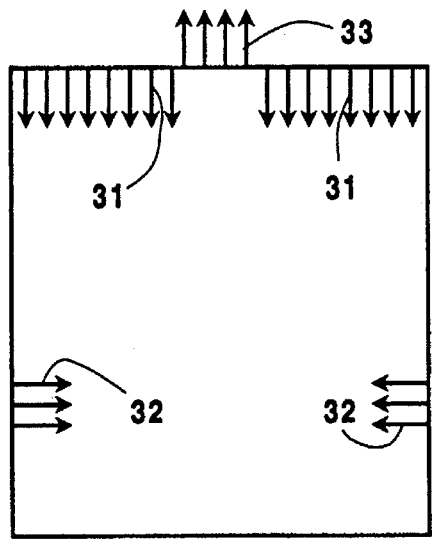
FIGS. 3A, 3B, 3C and 3D depict four examples of stratified atmosphere furnaces according to the invention, with different arrangements of burners, flues, and means for injecting a charge-proximal gas.
Figure 3B:
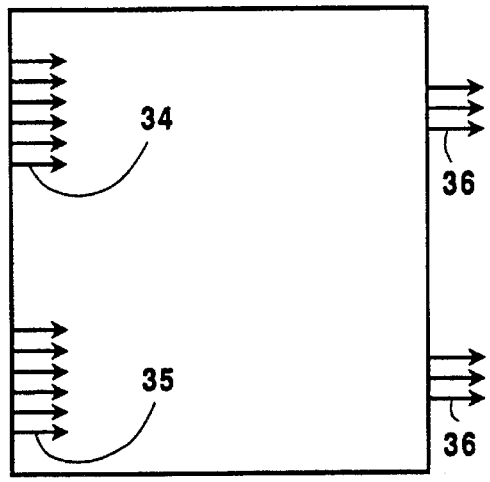
Figure 3C:
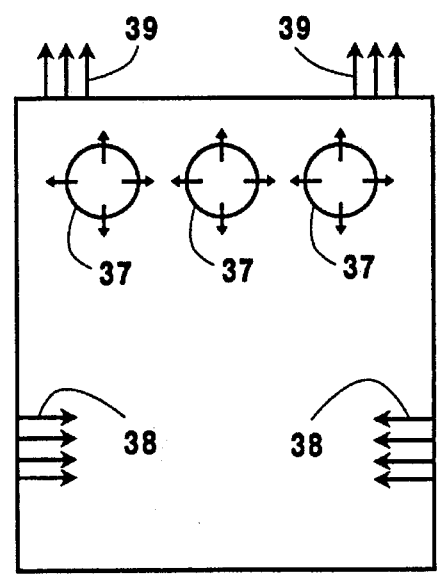
Figure 3D:
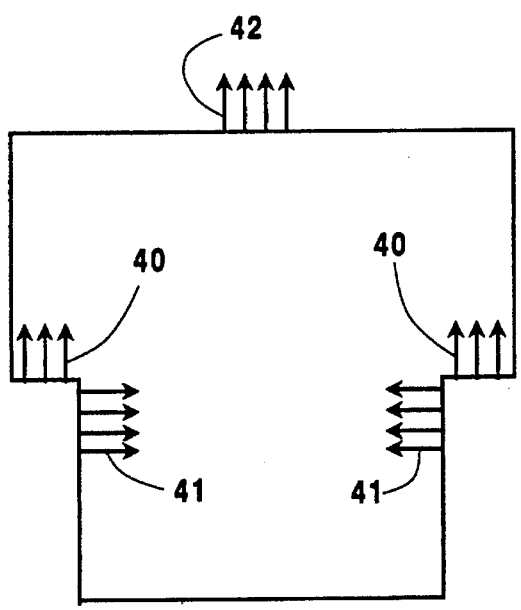

The furnace illustrated in FIG. 1 was used to conduct tests of the invention. The furnace 1 measured 28" long by 18" wide by 23" high. The burner 2 provided natural gas and oxidant, having an oxygen concentration of 100 mole percent, i.e. industrial grade pure oxygen, into the furnace at a velocity within the range of from 1 to 2 fps where they combusted in a low velocity flame 3. Nitrogen was used as the charge-proximal gas and was provided into the furnace at a velocity within the range of from 0.2 to 0.6 fps through laminar diffusers 4. The provision means for the fuel and oxygen to the burner and the nitrogen to the diffusers are not illustrated in FIG. 1. The furnace gases were exhausted from the furnace through flue 5 which was placed in the center of the wall perpendicular to the furnace wall in which furnace 2 was located. Carbon dioxide measurements were taken by placing a probe horizontally underneath the burner side diffuser, between the bottom of the diffuser and the floor of the furnace which served as a proxy for a charge surface. The burner firing rate was kept constant at 0.1 million BTU/HR and the total flow rate of the fuel and oxidant were 300 SCFH. FIG. 4 is a plot of $CO_2$ concentration versus the normalized distance between the two diffusers. Three different nitrogen gas flow rates, 600, 400 and 200 SCFH were used. In a typical oxy-fuel fired furnace, the $CO_2$ concentration on a dry basis at the charge surface is about 85 to 90 mole percent. The $CO_2$ concentration in the combustion stratum of the furnace depends on the nitrogen flow rate, the flue location and the degree of mixing. If nitrogen is well mixed with the combustion products, the $CO_2$ concentration in the combustion stratum of the furnace becomes 14%, 20% and 33% under the test conditions. As can be seen from the results of these tests, the invention enables the attainment of a significant reduction in the $CO_2$ concentration in the charge-proximal stratum when compared with its concentration in the combustion stratum. At a flowrate of 600 chf for the nitrogen, there was effectively no $CO_2$ measured at the bottom of the test furnace.

I claim:

1. A method for heating or melting a charge of material in a direct-fired furnace, comprising:
   (A) introducing said charge into said furnace to expose said charge to radiant heat from a direct-fired burner placed above said charge;
   (B) providing fuel and oxidant into the furnace from said direct-fired burner at a mass average velocity not exceeding 50 feet per second, and combusting the fuel and oxidant within the furnace to generate heat and to produce combustion gases; and
   (C) introducing a charge-proximal gas into the furnace between said direct-fired burner and said charge at a point at least 50 percent of the vertical distance from the burner to the charge at a velocity not exceeding 50 feet per second wherein said charge-proximal gas has a higher density than said fuel and oxidant to create charge-proximal atmospheric stratum that contains a substantially reduced amount of said combustion gases, thereby exposing said charge to a furnace atmosphere of oxidative properties that are different from those that exist in the absence of said charge-proximal gas, and exhausting combustion gases from the furnace from an exhaust located above the burner.

2. A method according to claim 1 wherein said gas is substantially inert with respect to said charge.

3. A method according to claim 1 wherein said charge-proximal gas increases oxidation of said charge.

4. A method according to claim 1 wherein said charge-proximal gas comprises nitrogen.

5. A method according to claim 1 wherein said charge-proximal gas is passed through said charge into said furnace when said charge is molten.

6. A method according to claim 1 wherein the charge comprises steel.

7. A method according to claim 1 wherein the charge comprises aluminum.

8. A method according to claim 1 wherein the charge comprises glass.

9. A method according to claim 1 wherein the oxidant is a fluid comprising at least 30 mole percent oxygen.

10. A method according to claim 1 wherein the oxidant is pure oxygen.

11. A method according to claim 1 wherein the oxidant and the charge-proximal gas are both taken from an air separation plant which separates air into a nitrogen-rich fluid and into an oxygen-rich fluid.

12. A method according to claim 11 wherein the air separation plant is a pressure swing adsorption separation plant.

13. A method according to claim 11 wherein the air separation plant is a membrane separation plant.

* * * * *